(12) United States Patent
Hachtel

(10) Patent No.: US 6,533,365 B1
(45) Date of Patent: Mar. 18, 2003

(54) METHOD AND DEVICE FOR DRIVING A MEANS FOR DELIVERING A PRESSURIZED MEDIUM IN A VEHICLE BRAKING SYSTEM AS A FUNCTION OF THE VEHICLE SPEED

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/629,302

(22) Filed: Jul. 31, 2000

(30) Foreign Application Priority Data

Jul. 29, 1999 (DE) ......................... 199 35 373

(51) Int. Cl.$^7$ ............................. B60T 13/18
(52) U.S. Cl. ...................... 303/11; 303/116.1
(58) Field of Search ................ 303/10, 11, 138, 303/155, 166, 116.1, 116.3, 122

(56) References Cited

U.S. PATENT DOCUMENTS

| 5,152,585 A | * | 10/1992 | Patient et al. | 303/10 |
| 5,197,787 A | * | 3/1993 | Matsuda et al. | 303/10 |
| 5,487,593 A | * | 1/1996 | Potts et al. | 303/11 |
| 6,095,620 A | * | 8/2000 | Dilliard et al. | 303/11 |
| 6,155,653 A | * | 12/2000 | Borchert | 303/11 |

FOREIGN PATENT DOCUMENTS

DE 44 40 517 5/1996

OTHER PUBLICATIONS

Bosch Automotive Handbook 4$^{th}$ edition, Oct. 1996, p. 773.*

* cited by examiner

Primary Examiner—Jack Lavinder
Assistant Examiner—Thomas J. Williams
(74) Attorney, Agent, or Firm—Kenyon & Kenyon

(57) ABSTRACT

A method and device for driving an arrangement, in a vehicle, that delivers a pressurized medium in a brake system, the pressurized medium being delivered in at least one brake circuit of the brake system, and a pressurized medium volume available in the brake circuit being dependent upon the driving of the arrangement delivering the pressurized medium. In this context, the arrangement delivering the pressurized medium is driven as a function of the vehicle speed so as to effect a correlation between the vehicle speed and the pressurized medium volume available in the brake circuit. This means, in particular, that the vehicle speed and the pressurized medium volume available in the brake circuit are linked in such a way that, with rising vehicle speed, the available volume of pressurized medium in the brake circuit is increased, and/or with falling vehicle speed, the available volume of pressurized medium in the brake circuit is decreased. This ensures that a sufficient volume of pressurized medium is available, even in the case of heavy volumetric consumption during a brake application, in which the arrangement delivering the pressurized medium does not adequately supply the pressurized medium.

10 Claims, 4 Drawing Sheets

METHOD AND DEVICE FOR DRIVING A MEANS FOR DELIVERING A PRESSURIZED MEDIUM IN A VEHICLE BRAKING SYSTEM AS A FUNCTION OF THE VEHICLE SPEED

FIELD OF THE INVENTION

The present invention relates to a method and a device for driving an arrangement that delivers a pressurized medium in a vehicle brake system to adjust an available volume of pressurized medium.

BACKGROUND INFORMATION

The German Published Patent Application No. 44 40 517 describes a method and a device for driving a return pump of a brake system, where the return pump is able to be controlled as a function of the manipulated variable and/or of the system deviation of a slip controller and/or of a governor that is able to influence the driving speed of a vehicle. In this context, for example, a vehicle speed governor or a vehicle speed limiter transmits a signal to an ABS/ASR system which indicates a desired brake application and/or a desired braking torque. An appropriate signal, which indicates a brake application, can also be supplied by other systems, for example by a vehicle dynamics control. Such systems now provide for the pressure buildup to be defined by way of the pump motor in response to an active brake application, the return pump being driven as a function of demand during the pressure buildup. The result is that the return pump is driven during the brake application that is active at the moment, as a function of the system deviation of a governor which influences the braking torque and/or the wheel speed.

The related art is not able to provide optimal results in every respect. It is precisely a brake application at a higher vehicle velocity, for example with ABS control, that leads to a distinctly greater volumetric consumption than at a lower vehicle velocity. Thus, at a very high volumetric consumption of the pressurized medium, safety can be jeopardized by an insufficient volume in the brake circuit and by a pump that is delivering too slowly. Thus, the objective to be fulfilled is to devise a method and device which will make it possible for a sufficient volume of pressurized medium to be available at all times in a vehicle's brake system, and, in the process, will enhance safety. The aim is to achieve this objective with the simplest possible implementation.

SUMMARY OF THE INVENTION

The method and device according to the present invention make it possible to advantageously avoid a situation, for example, where there is insufficient pressurized medium volume during a brake application, in spite of the arrangement delivering the pressurized medium being driven to a maximum. This is achieved by setting up a relationship between the pressurized medium volume available in at least one brake circuit, which depends on the driving of the arrangement delivering the pressurized medium, and the vehicle speed. This entails driving the arrangement delivering the pressurized medium as a function of the vehicle speed so as to effectively correlate the vehicle speed and the pressurized medium volume available in the brake circuit.

The vehicle speed and the pressurized medium volume available in the brake circuit are correlated to effect that with rising vehicle speed, the available volume of pressurized medium in the brake circuit is increased, and/or with falling vehicle speed, the available volume of pressurized medium in the brake circuit is decreased.

In one advantageous refinement, the pressurized medium volume available in the brake circuit is adjusted in a storage device in communication with the brake circuit by the pressurized medium volume contained therein and, in fact, in such a way that the pressurized medium volume in the storage device is increased in response to rising vehicle speed, and/or lowered in response to falling vehicle speed.

In the process, a pressure quantity prevailing in the brake system is advantageously determined, which can be used to determine and/or adjust the available volume of pressurized medium.

Also beneficial is that the driving of the arrangement delivering the pressurized medium is activated or deactivated as a function of at least one predefinable threshold value of the pressure quantity, the threshold value being expediently predefined and/or adjusted in a dependency ratio to the vehicle speed.

In one advantageous refinement, the driving of the arrangement delivering the pressurized medium is activated or deactivated as a function of the pressure quantity in such a way that in response to a first pressure-quantity threshold value being reached and/or not attained, the driving is activated, and, in response to a second pressure-quantity threshold value being reached and/or exceeded, the driving is deactivated. The enable, i.e., disable limits of this hysteresis are thus expediently varied as a function of the vehicle speed in such a way that the available pressurized medium volume also suffices in consideration of safety aspects.

Also beneficial is that the dependency ratio between pressurized medium volumes and vehicle speed can be so formulated that, from a comparison of the vehicle speed to speed threshold values, vehicle-speed ranges can be predefined, and threshold values for the pressure quantity can be preset in each of these ranges. In the same way, the dependency ratio can advantageously be so conceived that the particular threshold values for the pressure quantity can be allocated to the vehicle's speed by a characteristic curve or a characteristics map. In the same way, the dependency ratio can advantageously be predefined or adjusted as a linear relation, in particular as a proportional relation, between the vehicle speed and threshold values of the pressure quantity.

Thus, by shifting the hysteresis of the closed-loop control of the arrangement delivering the pressurized medium as a function of the vehicle speed, a greater volume of pressurized medium is made available at the beginning of a brake action, in particular in the storage device of an electrohydraulic brake system, thereby assuring that, in spite of a heavy volumetric consumption of pressurized medium, a sufficient volume of pressurized medium is always present, in particular in the storage device.

DETAILED DESCRIPTION

Figure 1:
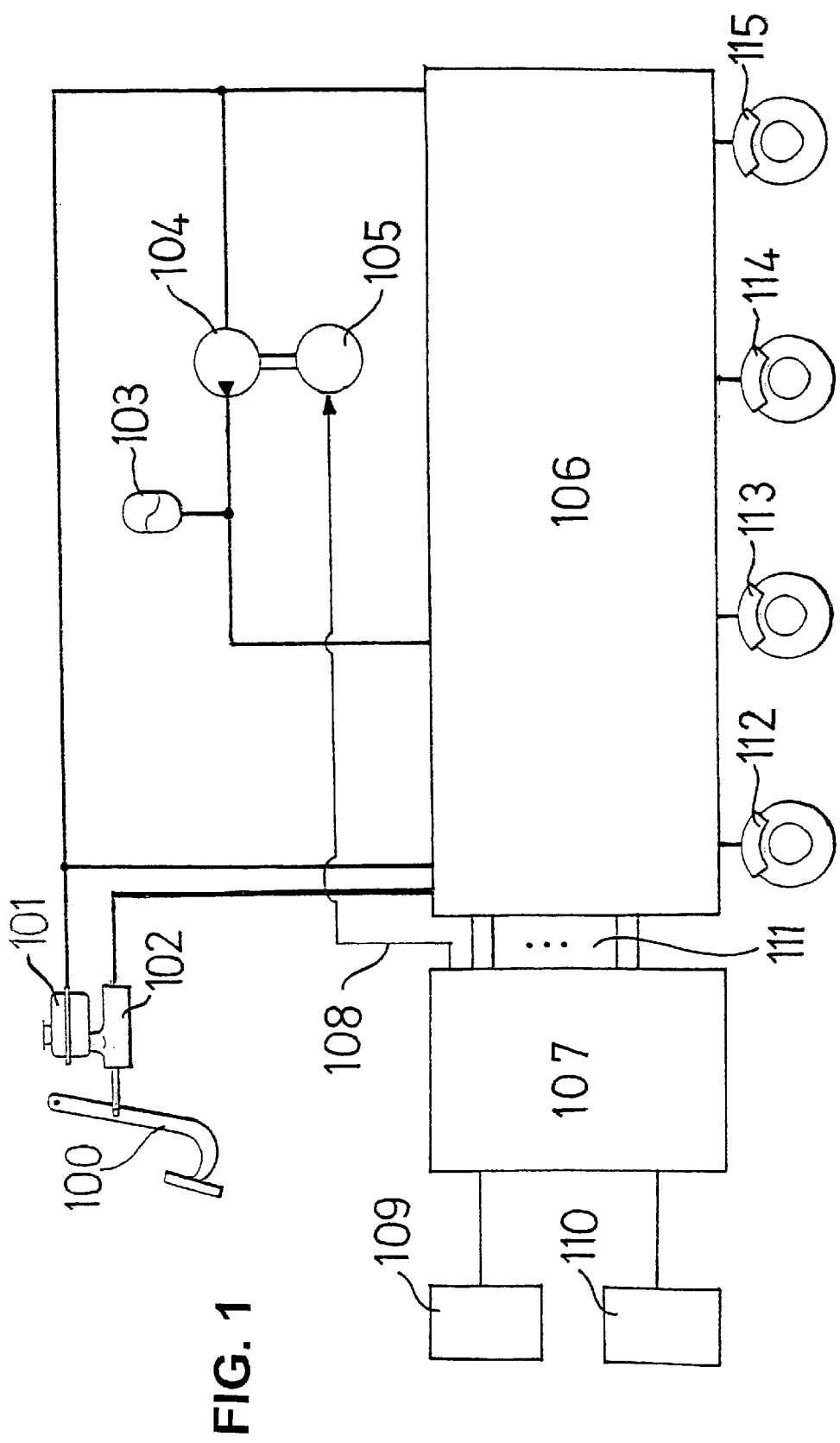
FIG. 1 shows a brake system according to the present invention, in particular an electrohydraulic brake system.

FIG. 1 depicts a brake system, in particular an electrohydraulic brake system, in which the pressurized medium, thus the brake fluid, is applied from a pressure storage 103, via valves, to wheel brake cylinders 112 through 115. To represent the methods and devices in a straightforward and universal fashion, a large part of the brake system including the brake circuits is included in block 106, and not explicitly shown. Pressure storage 103 is charged by an arrangement, constituted as a pump 104, that delivers the pressurized medium. In the illustrated brake system, a brake pedal 100 is shown, which communicates with a master brake cylinder 102. By way of the brake pedal, pressure can be built up in master brake cylinder 102. Master brake cylinder 102 is in contact with a reservoir 101. Lines for the pressurized medium run from master brake cylinder 102, as well as from reservoir 101, into brake system 106. Brake system 106 includes a valve arrangement and, in the case of an electrohydraulic brake system, for example a pedal travel simulator, as well as other components known to one skilled in the art from the related art, depending on the specific embodiment of the brake system. In a line between reservoir 101 and brake system 106, the arrangement delivering the pressurized medium is shown in the form of pump 104. 105 illustrates a drive, for example in the form of an electromotor, for actuating the pump. Mounted between pump 104 and brake system 106 is a pressure storage 103. Brake system 106 communicates by way of lines for the pressurized medium with wheel brake cylinders 112 through 115. Control unit 107 represents controlling in open and closed loop, respectively, those components of the brake system that are able to be controlled in open and closed loop. The connections leading away from or towards control unit 107, including the corresponding actuator and/or sensor technology of brake system 106, such as the pressure sensors, are schematically indicated in a group of lines 111. In this context, drive line 108 for pump motor 105 is explicitly shown. Other sensory mechanisms external to the brake system, such as wheel-speed sensors, vehicle-speed sensors, etc., are denoted by 109. Other sensory mechanisms possibly include a sensor for the pressure prevailing in pressure storage 103. Besides the use of sensor elements to detect pressure quantities, a pressurized-medium volume can also be ascertained using estimation methods known to one skilled in the art. Element 110 represents other possible control units or a higher-level logic, which communicate with control unit 107 of the brake system.

By way of sensor mechanisms 109, quantities, such as vehicle speed, and/or engine speed, and/or wheel speed, and/or pressure quantities, and/or flow quantities of the pressurized medium volume, etc., are detected. Comparable information can also be queried, however, via other control units 110, and transmitted to control unit 107 of the brake system. Control units 110 can contain, for example, a valve-timing unit, and/or a transmission control unit, and/or a higher-order logic, such as a vehicle dynamics control.

Overall, therefore, the brake system is used for controlling the braking action and/or the driving stability in open and/or closed loop, as well as for ensuring vehicle safety. In the special specific embodiment of an electrohydraulic brake system, in response to a brake application, pressure is applied via valves from a pressure storage to the wheel brake calipers, thus to the wheel brake cylinders. Therefore, a specific volume of pressurized medium or brake fluid is stored in this pressure storage. In another specific embodiment, pressure storage 103, illustrated externally to brake system 106, is missing, for example, and the volume of pressurized medium available during a brake application is itself in reserve in the particular brake circuit, including its lines, the valve arrangement, an intermediate storage device and damper chambers, etc. A pressure quantity, for example, in the pressure storage or in another brake circuit location establishes the relationship with the pressurized medium volume. Thus, a functional chain is able to be described. Also, the arrangement delivering the pressurized medium, thus, in the exemplary embodiment, pump 104, influences the pressure quantity in the brake circuit, i.e., in the exemplary embodiment, in the pressure storage, i.e., can be used to adjust the pressure quantity. For its part, the pressure quantity can be used to detect and/or adjust a volume of pressurized medium.

Figure 2:
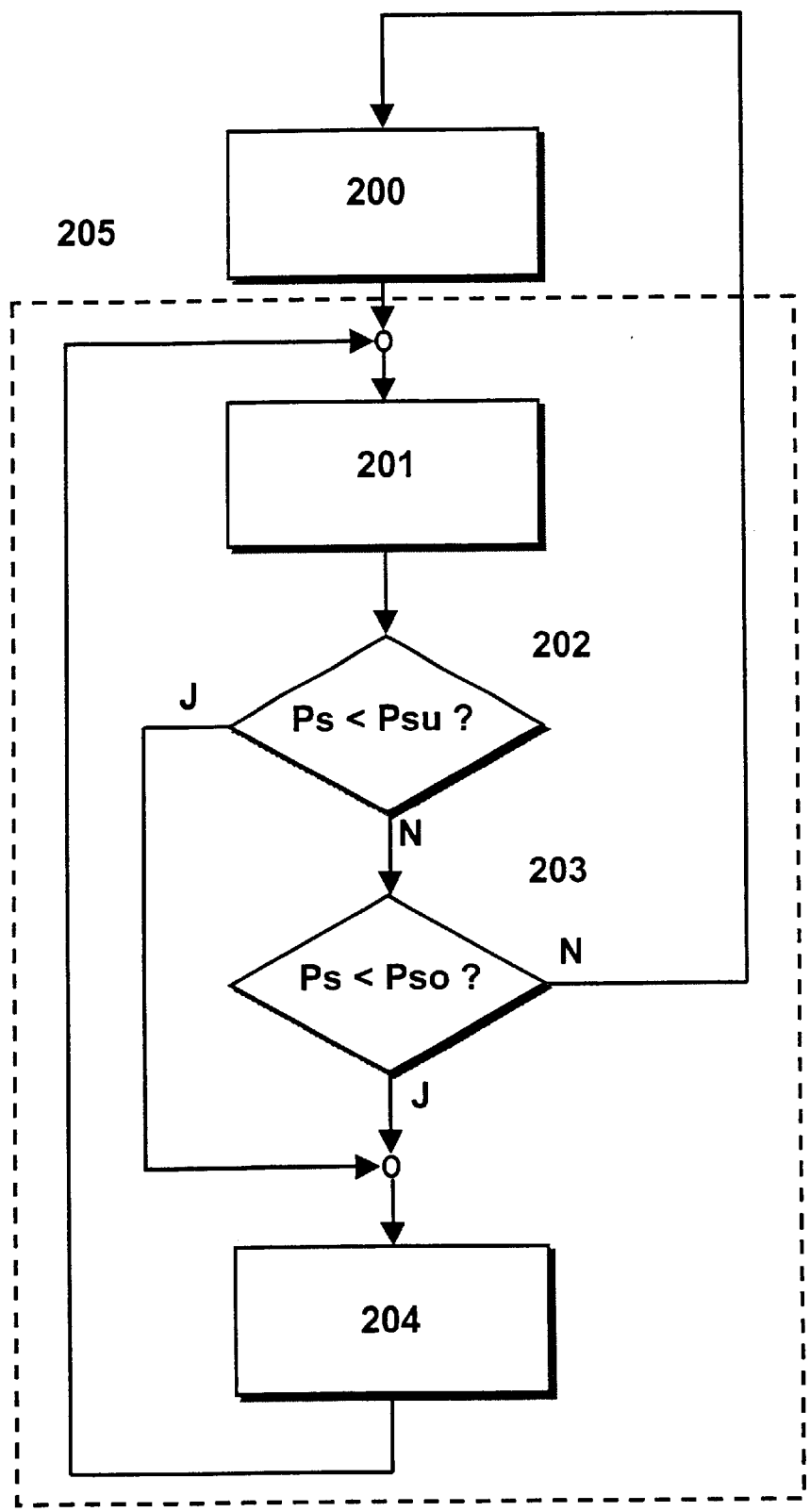
FIG. 2 depicts a method for driving the arrangement delivering the pressurized medium, in particular using pressure thresholds allocated to a pressure quantity.

For this, FIG. 2 depicts a method for driving pump 104 or pump motor 105. In block 200, the pump either is or will be switched off.

In the following block 201, threshold values are able to be defined for pressure quantity Ps, for example in pressure storage 103. In this special specific embodiment, pressure quantity Ps, in particular the storage pressure, is adjusted by way of a two-step hysteresis control. Thus, a lower threshold value Psu and an upper threshold value Pso are predefined for pressure quantity Ps. In this context, in response to falling below a specific pressure level, thus lower threshold Psu, the pump is turned on, and, in response to exceeding a specific pressure level, thus upper threshold value Pso, the pump is switched off again. For the reasons just mentioned, threshold values Psu, as well as Pso are preset as a function of the speed of vehicle v. This can be implemented in the form of speed ranges and pressure thresholds allocated thereto, as well as in the form of a characteristics map or at least a characteristic curve. Since the volumetric consumption of pressurized medium in response to a brake application at a high vehicle speed until vehicle standstill is clearly greater than at a low vehicle speed, the switch-on or switch-off limits of the controlled hysteresis, thus, in this case, pressure threshold values Psu and Pso, are varied as a function of the vehicle speed v in such a way that the available or stored pressurized medium volume, for example in the storage device or in the brake circuit, is greater at a higher vehicle speed than at a lower vehicle speed.

At this point, query 202 ascertains whether pressure quantity Ps is less than lower threshold value Psu. If this is the case, one arrives at block 204, where the pump is turned on. In block 204, one can likewise adjust the driving of the pump itself, thus, for example, driving to a maximum, or clocked operation, as well as, in clocked operation, the required mark-to-space ratio PPV. Important, however, is the use of pressure thresholds Psu or Pso as a switch-on condition for the pump.

If pressure Ps is not less than lower pressure threshold Psu, one arrives at query 203. There, the second threshold value for the pressure, upper pressure threshold Pso, is queried. If pressure quantity Ps is less than upper pressure threshold Pso, one arrives again at block 204, and the pump is switched on, i.e., remains in the switched-on condition. If upper pressure threshold Pso is reached or exceeded, one arrives at block 200, where the pump is switched off, i.e., remains in the switched-off condition.

Steps 201 through 204 from FIG. 2 are combined again in block 205, which can be optionally used later in FIG. 4. Thus, the method illustrated in FIG. 2 makes it possible to avoid the situation where, for example, the volume of pressurized medium does not suffice during a brake application, in spite of driving the pump to the maximum. This is achieved, in particular at higher vehicle speeds, by advantageously moving up the cut-in points of the controlled hysteresis. This makes a greater volume of pressurized medium available at the beginning of a brake application, in particular in the pressure storage, thereby ensuring in advance that a sufficient volume of pressurized medium is always available, in spite of heavy consumption.

Figure 3A:
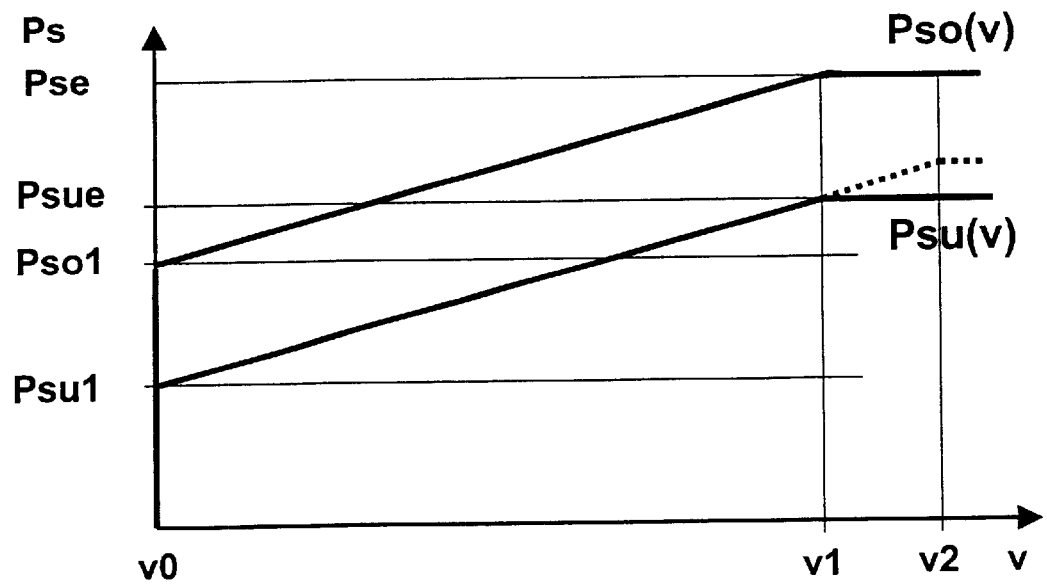
FIG. 3a illustrates a linear relationship between the pressure quantity and the vehicle speed.
Figure 3B:
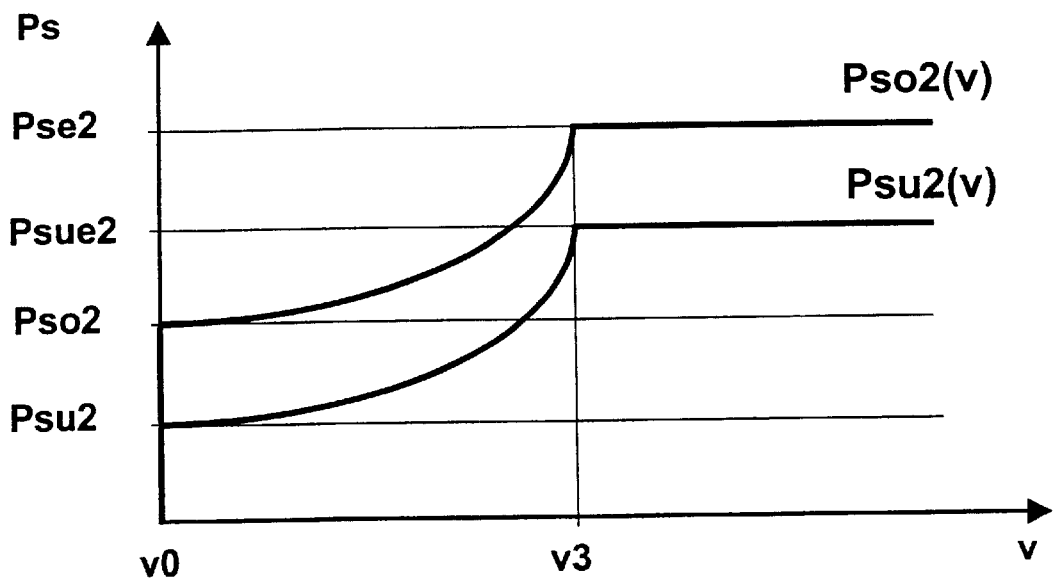
FIG. 3b shows the relationship between the vehicle speed and the pressure quantity to be a non-linear relationship.

One possible method for allocating pressure quantity Ps to speed v of the vehicle, i.e., threshold values Psu and Pso in the form of characteristic curves, is depicted in FIGS. 3a and 3b, respectively. These characteristic curves could, for example, be used as a basis for defining threshold values Pso and Psu in block 201 of FIG. 2. FIG. 3a shows a linear relationship between vehicle speed v and pressure quantity Ps. At a minimum speed v0, corresponding in particular to zero, thus to vehicle standstill, the start values of the thresholds are stipulated for pressure Psu1 and Pso1. Using these start values as a baseline, with rising vehicle speed v, the values of the pressure thresholds Pso or Psu in question are increased, until an upper range value Pse is finally reached for pressure quantity Ps at a speed v1. On the one hand, this can be a predefinable, variable upper range value or, however, the pressure limit of the brake system itself, or of the pressure storage, or of that element of the brake circuit which is the weakest due to mechanical stress. In this context, characteristic curves Pso(v) and Psu(v) run in parallel to one another, i.e., the hysteresis, as such, is stabilized. It would also be conceivable, for example, to retain the lower threshold Psu, thus as characteristic curve Psu(v), at the constant value Psu1, and to merely increase the upper threshold Pso. However, this would entail a very high energy consumption for the pump, since the total period of time in which the pump is switched on, would be increased. Therefore, an advantageous solution is for the controlled hysteresis, i.e., the range between the upper and lower pressure threshold to be, at the most, less than the preset range between Psu1 and Pso1, but not to let it become larger than this preset range. This possible reduction in the range is shown in FIG. 3a by the dotted characteristic curve. However, this reduction cannot take place first at v1, but rather already previously thereto. On the other hand, however, the range of the threshold values, thus the hysteresis, should not be too small, since, otherwise, the pump would be set in operation, for example, even in response to a cooling of the pressurized medium and, thus, to a falling pressure in the pressurized medium. This would likewise lead to an increased loading of the vehicle's electrical system, due to the pump's energy consumption. A reduction in the hysteresis to the point where ultimately only one threshold would still exist, due to the pump being constantly switched on and off during closed-loop control to the one threshold, would also lead to heavy fluctuations in and, thus, substantial loading of the vehicle's electrical system. Thus, at Psu(v), the lower threshold value Psu is no longer increased starting at a speed v1. Given a desired, further reduction in the hysteresis, as shown by a dotted line, Psu(v) then remains constant, starting with predefinable speed v2. Thus, the hysteresis, i.e., the range from switch-on pressure Psu to switch-off pressure Pso, can expediently be kept constant in FIG. 3a. In this case, as a result of lower threshold Psu, an upper range value Psue is reached, for which it applies, accordingly, that Pso1−Psu1=Pse−Psue.

The considerations of FIG. 3a apply analogously to FIG. 3b. It shows a non-linear relationship between pressure quantity Ps and vehicle speed v. Using a speed v0 as a baseline, which corresponds, in particular, to zero, thus to vehicle standstill, the threshold values are increased, beginning from start values Psu2 and Pso2, up to vehicle speed v3. The characteristic curve Pso2(v) then changes at v3 into constant value Pse2, as an upper range value. This can correspond, as in FIG. 3a, to the maximum permissible load of the system or to a predefinable upper range value. In the same way, characteristic curve Psu2(v) for lower threshold value Psu2 changes at speed v3 into a constant value Psue2. The considerations with respect to increase and reduction in the hysteresis apply analogously to FIG. 3a. The non-linear characteristic of pressure quantity Ps or of characteristic curves Psu2(v) and Pso2(v) over speed v can, therefore, likewise be taken as a basis for stipulating threshold values Psu or Pso in block 201 in FIG. 2.

Figure 4:
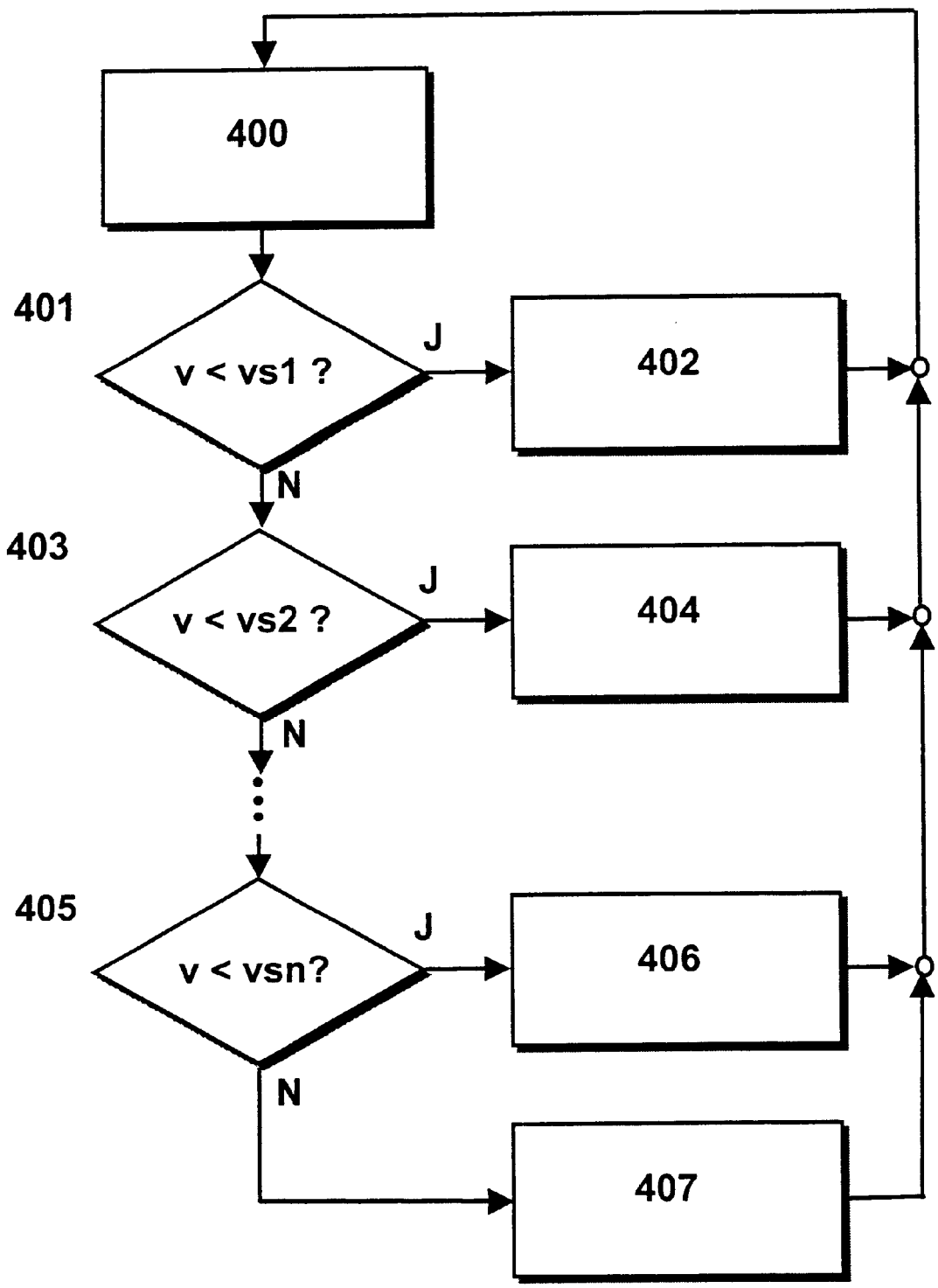
FIG. 4 reveals a method for driving the arrangement delivering the pressurized medium, as a precondition, specific speed ranges being predefined by speed threshold values.

In a flow chart, FIG. 4 depicts another variant for driving the pump as a function of vehicle speed v. In the same way as FIG. 2, this functional sequence can be implemented as programming code in a control unit or data memory, thus as software or as hardwired-logic in hardware. In block 400, the pump is switched off or remains switched off. In the same way, speed v of the vehicle is determined in block 400. This can be achieved using direct vehicle-speed sensory mechanisms, or also indirect sensory mechanisms, or on the basis of information, such as that derived from wheel-speed sensors, or from engine speed or axle speed, etc. Vehicle-speed threshold values vs1 through vsn can be specified from a situation-dependent table or from a characteristic curve. In this context, in driving tests, and/or simulated tests, and/or from empirical values, one can define useful speed ranges that are able to be further adapted during the driving operation. As just described, the pressure thresholds in FIG. 2 can also be stipulated. This means that, in principle, the speed thresholds can be predefined comparably to the pressure thresholds in FIG. 2.

At this point, it is checked in query 401, whether the determined vehicle speed v is less than a threshold value vs1. If this is the case, a pump is driven in accordance with block 402 in this first speed range, up to vs1. On the one hand, the pump can be driven at full capacity in this block until a volume V1 of pressurized medium is reached. In the same way, however, in block 402, a mark-to-space ratio PPV1 for driving the pump can be specified in the first speed range, up to vs1. When the first speed threshold vs1 is reached or exceeded, one arrives at query 403. In query 403, a second vehicle speed threshold vs2 is checked. If this threshold is not yet reached, one arrives at block 404. In this second speed range of vs1 to vs2, the pump is switched on in block 404 until a volume V2 of pressurized medium is reached. Here, however, analogously to block 402, a mark-to-space ratio PPV2 for driving the pump can be specified. When the speed threshold vs2 is reached or exceeded, one arrives in the next speed range. This continues until a last threshold vsn. In query 405, it is checked whether this last speed threshold vsn had been reached or exceeded by vehicle speed v. If vsn is not yet reached, one arrives at block 406. Here, the pump is switched on until a volume V3 is reached. In the same manner, a mark-to-space ratio PPV3 can be specified. If the last speed threshold vsn is exceeded or reached, one arrives at block 407, where the pump's operating time is set, so that a volume V4 is reached. As in block 402, 404, 406, in block 407, the specific volume of pressurized medium is either reached as quickly as possible by driving to capacity, or, on the other hand, the time that elapses until the desired pressurized medium volume is reached can be adjusted, for example from a standpoint of noise and/or stress, by specifying a mark-to-space ratio PPV, in this case PPV4. Once the particular volume is reached in block 402, 404, 406, as well as 407, one arrives again at block 400, where the pump is switched off.

In one special specific embodiment, a functional sequence in accordance with block 205 from FIG. 2 can also be introduced in blocks 402, 404, 406 and 407. The quantities to be specified and analyzed there can then be individually adjusted as a function of the particular speed range. This concerns, in particular, pressure threshold values Psu and Pso for each speed range.

What is claimed is:

1. A method for driving an arrangement for delivering a pressurized medium in a vehicle brake, comprising the steps of:
    delivering the pressurized medium in at least one brake circuit of the vehicle brake system, wherein a pressurized medium volume available in the at least one brake circuit is dependent upon a driving of the arrangement for delivering the pressurized medium;
    driving the arrangement for delivering the pressurized medium as a function of a vehicle speed so as to effect a correlation between the vehicle speed and the pressurized medium volume available in the at least one brake circuit;
    ascertaining a pressure quantity prevailing in the vehicle brake system in order to at least one of determine and adjust the pressurized medium volume;
    performing one of an activation and a deactivation of the driving of the arrangement for delivering the pressurized medium as a function of at least one predefinable threshold value of the pressure quantity;
    performing one of a predefining and an adjusting of the at least one predefinable threshold value in a dependency ratio to the vehicle speed; and
    performing one of a predefining and an adjusting of the dependency ratio as a linear relation.

2. The method according to claim 1, further comprising the step of:
    correlating the vehicle speed and the pressurized medium volume available in the at least one brake circuit to effect at least one of the following conditions:
        that with a rising of the vehicle speed, the pressurized medium volume available in the at least one brake circuit is increased, and
        that with a falling of the vehicle speed, the pressurized medium volume available in the at least one brake circuit is decreased.

3. The method according to claim 1, further comprising the steps of:
    adjusting the pressurized medium volume available in the at least one brake circuit in a storage device for the pressurized medium in communication with the at least one brake circuit, by the pressurized medium volume contained therein; and
    performing one of the steps of:
        in response to a rising of the vehicle speed, increasing the pressurized medium volume in the storage device, and
        in response to a falling of the vehicle speed, lowering the pressurized medium volume in the storage device.

4. The method according to claim 1, further comprising the steps of:
    ascertaining a pressure quantity in the vehicle brake system;
    determining and adjusting the pressurized medium volume in accordance with the pressure quantity;
    activating the driving of the arrangement for delivering the pressurized medium in response to a first pressure-quantity threshold value being at least one of reached and not attained;
    deactivating the driving of the arrangement for delivering the pressurized medium in response to a second pressure-quantity threshold value being at least one of reached and exceeded; and
    performing one of a presetting and an adjusting of the first pressure-quantity threshold value and the second pressure-quantity threshold value in a dependency ratio to the vehicle speed.

5. The method according to claim 4, further comprising the step of:
    formulating the dependency ratio such that, from a comparison of the vehicle speed to speed threshold values, speed ranges are predefined, and the first pressure-quantity threshold value and the second pressure-quantity threshold value are preset in each speed range.

6. The method according to claim 4, further comprising the step of:
    formulating the dependency ratio such that the first pressure-quantity threshold value and the second pressure-quantity threshold value are allocated to the vehicle speed by at least one of a characteristic curve and a characteristics map.

7. The method according to claim 1, wherein:
    the linear relation corresponds to a proportional relation.

8. A brake system, comprising:
    a first arrangement for delivering a pressurized medium in a brake system;
    a control unit for driving the first arrangement by way of a drive signal;
    a second arrangement for determining a pressurized medium volume in the brake system that is able to be adjusted by the first arrangement;
    a third arrangement for determining a vehicle speed; and
    a fourth arrangement for receiving the pressurized medium volume and the vehicle speed as input quantities, and for producing and predefining a condition for one of activating and deactivating the drive signal in such a way that the pressurized medium volume is adjusted as a function of the vehicle speed, wherein:
        the condition depends on at least one threshold value for a pressure quantity in the brake system,
        the at least one threshold value is one of predefined and adjusted in a dependency ratio to the vehicle speed, and
        the dependency ratio is one of predefined and adjusted as a linear relation.

9. A device, comprising:
    a control unit for driving an arrangement for delivering a pressurized medium in a vehicle brake system using a drive signal;
    a first arrangement for determining a pressurized medium volume in the vehicle brake system that is adjustable by the arrangement for delivering the pressurized medium;
    a second arrangement for determining a vehicle speed; and
    a third arrangement for communicating with the first arrangement, the second arrangement, and the control unit, and for receiving the pressurized medium volume and the vehicle speed as input quantities, the third arrangement producing and predefining a condition for one of activating and deactivating the drive signal in such a way that the pressurized medium volume is adjusted as a function of the vehicle speed, wherein:

the condition depends on at least one threshold value for a pressure quantity in the vehicle brake system, the at least one threshold value is one of predefined and adjusted in a dependency ratio to the vehicle speed, and the dependency ratio is one of predefined and adjusted as a linear relation.

10. A control unit for driving an arrangement for delivering a pressurized medium in a vehicle brake system, comprising:

a program memory for storing a program for controlling a performance of the steps of:

delivering the pressurized medium in at least one brake circuit of the vehicle brake system, wherein a pressurized medium volume available in the at least one brake circuit is dependent upon a driving of the arrangement for delivering the pressurized medium, and driving the arrangement for delivering the pressurized medium as a function of a vehicle speed so as to effect a correlation between the vehicle speed and the pressurized medium volume available in the at least one brake circuit; and an execution unit for executing the program, wherein:

a condition for one of activating and deactivating the driving of the arrangement for delivering the pressurized medium depends on at least one threshold value for a pressure quantity in the vehicle brake system, the at least one threshold value is one of predefined and adjusted in a dependency ratio to the vehicle speed, and the dependency ratio is one of predefined and adjusted as a linear relation.

\* \* \* \* \*